United States Patent
Del Sordo et al.

(10) Patent No.: US 12,231,713 B2
(45) Date of Patent: Feb. 18, 2025

(54) SYSTEM AND METHOD TO SYNCHRONIZE RENDERING OF MULTI-CHANNEL AUDIO TO VIDEO PRESENTATION

(71) Applicant: ARRIS Enterprises LLC, Suwanee, GA (US)

(72) Inventors: Christopher S. Del Sordo, Souderton, PA (US); Christopher R. Boyd, Chalfont, PA (US); Albert F. Elcock, West Chester, PA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 163 days.

(21) Appl. No.: 17/726,743

(22) Filed: Apr. 22, 2022

(65) Prior Publication Data

US 2023/0016118 A1    Jan. 19, 2023

Related U.S. Application Data

(60) Provisional application No. 63/220,041, filed on Jul. 9, 2021.

(51) Int. Cl.
*H04N 21/242* (2011.01)
*H04N 21/43* (2011.01)
*H04N 21/4363* (2011.01)

(52) U.S. Cl.
CPC ....... *H04N 21/4305* (2013.01); *H04N 21/242* (2013.01); *H04N 21/4307* (2013.01); *H04N 21/43635* (2013.01); *H04N 21/43637* (2013.01)

(58) Field of Classification Search
CPC ............. H04N 21/4305; H04N 21/242; H04N 21/4307; H04N 21/43635;

(Continued)

(56) References Cited

U.S. PATENT DOCUMENTS

| 6,631,410 B1 * | 10/2003 | Kowalski | ......... H04N 21/43615 709/224 |
| 2007/0110110 A1 * | 5/2007 | Miki | ................... H04N 21/2368 370/535 |

(Continued)

FOREIGN PATENT DOCUMENTS

WO    WO-2017166497 A1 *    10/2017    ............. H04N 21/41

OTHER PUBLICATIONS

International Search Report and Written Opinion of the International Searching Authority issued Jul. 8, 2022 in International (PCT) Application No. PCT/US2022/025915.

(Continued)

*Primary Examiner* — Behrooz M Senfi
(74) *Attorney, Agent, or Firm* — Wenderoth, Lind & Ponack, L.L.P.

(57) ABSTRACT

A system and method are provided for an AV device for use with a video player, one or more speakers, and encoded AV data. The encoded AV data includes multiplexed encoded video data and encoded audio data. The AV device is connected to the speakers via wireless channels. The AV device is able to determine channel delays associated with each wireless channel; synchronize program clocks of the video player and speakers; determine and modify buffer levels of each speaker; demultiplex the encoded AV data to obtain encode video data and encoded audio data; and provide prefetched portions of encoded audio data based on buffer levels.

15 Claims, 8 Drawing Sheets

(58) Field of Classification Search
CPC ......... H04N 21/43637; H04N 21/4341; H04N 21/4392; H04N 21/8106
USPC .................................................... 375/240.28
See application file for complete search history.

(56) References Cited

U.S. PATENT DOCUMENTS

| | | | |
|---|---|---|---|
| 2011/0142243 A1* | 6/2011 | Wee ....................... | H04H 20/89 381/2 |
| 2011/0234200 A1 | 9/2011 | Shenoi | |
| 2017/0069338 A1* | 3/2017 | Elliot ................... | H04R 29/007 |
| 2019/0387344 A1* | 12/2019 | Kim ........................ | H04R 5/04 |
| 2020/0084342 A1* | 3/2020 | Maker, III ............ | H04N 5/602 |
| 2020/0084491 A1* | 3/2020 | Asnis ................. | H04N 21/2368 |
| 2020/0186864 A1 | 6/2020 | Curtis et al. | |
| 2022/0248069 A1* | 8/2022 | Garvey ................ | H03K 5/1565 |

OTHER PUBLICATIONS

International Preliminary Report on Patentability issued Dec. 14, 2023 in corresponding International (PCT) Patent Application No. PCT/US2022/025915.

* cited by examiner time = T₀ time = T₁ time = T₂ time = T₃

SYSTEM AND METHOD TO SYNCHRONIZE RENDERING OF MULTI-CHANNEL AUDIO TO VIDEO PRESENTATION

BACKGROUND

Embodiments of the disclosure relate to synchronizing video presentation with multi-channel audio streams communicated on wireless channels.

SUMMARY

Aspects of the present disclosure are drawn to an audio/video (AV) device for use with a video player, a speaker, and encoded AV data. The encoded AV data includes multiplexed encoded video data and encoded audio data. The video player has a video player program clock and is configured to play a video based on the encoded video data and the video player program clock. The speaker is wirelessly connected to the AV device over a wireless channel. The speaker has a speaker program clock and is configured to play sound based on the encoded audio data and the speaker program clock. The wireless channel has a media parameter. The AV device comprises a memory and a processor. The processor is configured to execute instructions stored on the memory to cause the AV device to determine a buffer level of the speaker; demultiplex the encoded AV signal to obtain the encoded video data and the encoded audio data; determine a channel delay associated with the wireless channel; set the video player program clock and the speaker program clock to the same speed; modify the buffer level of the speaker based on the channel delay; and provide, to the speaker, a prefetched portion of the encoded audio data based on the modified buffer level.

In some embodiments, the wireless channel comprises a Wi-Fi channel and the encoded AV data comprises MPEG data.

In some embodiments, the AV device is connected to the video player with a high-definition multimedia interface (HDMI) cable. The encoded video data comprises MPEG video data. The processor is further configured to execute instructions stored on the memory to cause the AV device to decompress the MPEG video data and transmit the decompressed MPEG video data to the video player via the HDMI cable.

In some embodiments, the AV device is wirelessly connected to a second speaker over a second wireless channel. The second speaker has a second speaker program clock and is configured to play sound based on the encoded audio data. The second wireless channel has a second media parameter. The processor is configured to execute instructions stored on the memory to cause the AV device to determine a second buffer level of the second speaker; determine a second channel delay associated with the second wireless channel; modify the second buffer level of the second speaker based on the second channel delay; set the video player program clock, the speaker program clock, and the second speaker program clock to the same speed; and provide, to the second speaker, a second prefetched portion of the encoded audio data based on the modified second buffer level.

In some embodiments, the processor is further configured to execute the instructions stored on the memory to additionally cause the AV device to generate an audio streaming session based on the encoded audio data; replicate the audio streaming session for each of the speaker and the second speaker; and enable a trick play to be simultaneously performed by the speaker, the second speaker and the video player.

Other aspects of the present disclosure are drawn to a method of using an audio/video (AV) device with a video player, a speaker, and encoded AV data. The encoded AV data includes multiplexed encoded video data and encoded audio data. The video player has a video player program clock and is configured to play a video based on the encoded video data and the video player program clock. The speaker is wirelessly connected to the AV device over a wireless channel. The speaker has a speaker program clock and is configured to play sound based on the encoded audio data and the speaker program clock. The wireless channel has a media parameter. The method comprises determining, via a processor configured to execute instructions stored on a memory, a buffer level of the speaker; demultiplexing, via the processor, the encoded AV signal to obtain the encoded video data and the encoded audio data; determining, via the processor, a channel delay associated with the wireless channel; modifying, via the processor, the buffer level of the speaker based on the channel delay; setting, via the processor, the video player program clock and the speaker program clock to the same speed; and providing, via the processor and to the speaker, a prefetched portion of the encoded audio data based on the modified buffer level.

In some embodiments, the wireless channel of the method comprises a Wi-Fi channel and the encoded AV data of the method comprises MPEG data.

In some embodiments, the AV device of the method is connected to the video player with a high-definition multimedia interface (HDMI) cable. The encoded video data comprises MPEG video data. The method further comprises decompressing, via the processor, the MPEG video data and transmitting, via the processor, the decompressed MPEG video data to the video player via the HDMI cable.

In some embodiments, the method further comprises using the AV device with a second speaker connected to the AV device over a second wireless channel. The second speaker has a second speaker program clock and is configured to play sound based on the encoded audio data. The second wireless channel has a second media parameter. The method further comprises determining, via the processor, a second buffer level of the second speaker; determining, via the processor, a second channel delay associated with the second wireless channel; setting, via the processor, the video player program clock, the speaker program clock, and the second speaker program clock to the same speed; modifying, via the processor, the second buffer level of the second speaker based on the second channel delay; and providing, via the processor and to the second speaker, a second prefetched portion of the encoded audio data based on the modified second buffer level.

In some embodiments, the method further comprises generating, via the processor, an audio streaming session based on the encoded audio data; replicating, via the processor, the audio streaming session for each of the speaker and the second speaker; and enabling, via the processor, a trick play to be simultaneously performed by the speaker, the second speaker and the video player.

Other aspects of the present disclosure are drawn to a non-transitory, computer-readable media having computer-readable instructions stored thereon, the computer-readable instructions being capable of being read by an audio/video (AV) device for use with a video player, a speaker, and encoded AV data. The encoded AV data includes multiplexed encoded video data and encoded audio data. The video player has a video player program clock and is configured to play a video based on the encoded video data and the video player program clock. The speaker is wirelessly connected to the AV device over a wireless channel. The speaker has a speaker program clock and is configured to play sound based on the encoded audio data and the speaker program clock. The wireless channel has a media parameter. The computer-readable instructions are capable of instructing the AV device to perform the method comprising determining, via a processor configured to execute instructions stored on a memory, a buffer level of the speaker; demultiplexing, via the processor, the encoded AV signal to obtain the encoded video data and the encoded audio data; determining, via the processor, a channel delay associated with the wireless channel; modifying, via the processor, the buffer level of the speaker based on the channel delay; setting, via the processor, the video player program clock and the speaker program clock to the same speed; and providing, via the processor and to the speaker, a prefetched portion of the encoded audio data based on the modified buffer level.

In some embodiments, the non-transitory, computer-readable instructions are capable of instructing the AV device to perform the method wherein the wireless channel comprises a Wi-Fi channel and wherein the encoded AV signal comprises an MPEG signal.

In some embodiments, the AV device is connected to the video player with an HDMI cable. The encoded video data comprises MPEG video data. The non-transitory, computer-readable instructions are capable of instructing the AV device to perform the method further comprising decompressing, via the processor, the MPEG video data and transmitting, via the processor, the decompressed MPEG video data to the video player via the HDMI cable.

In some embodiments, the AV device is for further use with a second speaker connected to the AV device over a second wireless channel. The second speaker has a second speaker program clock and is configured to play sound based on the encoded audio data. The second wireless channel has a second media parameter. The non-transitory, computer-readable instructions are capable of instructing the AV device to perform the method further comprising determining, via the processor, a second buffer level of the second speaker; determining, via the processor, a second channel delay associated with the second wireless channel; setting, via the processor, the video player program clock, the speaker program clock, and the second speaker program clock to the same speed; modifying, via the processor, the second buffer level of the second speaker based on the second channel delay; and providing, via the processor and to the second speaker, a second prefetched portion of the encoded audio data based on the modified second buffer level.

In some embodiments, the non-transitory, computer-readable instructions are capable of instructing the AV device to perform the method further comprising generating, via the processor, an audio streaming session based on the encoded audio data; replicating, via the processor, the audio streaming session for each of the speaker and the second speaker; and enabling, via the processor, a trick play to be simultaneously performed by the speaker, the second speaker and the video player.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

Home audio and video systems are becoming increasingly sophisticated. In particular, playback of audio portions of content such as movies has evolved from mono, to stereo, to multi-channel systems comprising 6 channels (5.1 systems), 8 channels (7.1 systems), or more (e.g., Dolby Atmos). Multi-channel audio systems rely on speakers that are properly placed around a listening area in order to correctly recreate spatial cues; for example, a 5.1 system has front-center, front-left, front-right, surround-left, and surround-right speakers, plus a non-directional subwoofer. In a 5.1 audio system, surround-left and surround-right speakers are ideally placed slightly behind the listening area.

A prior-art multi-channel audio and video system will now be discussed with reference to FIG. 1.

Figure 1:
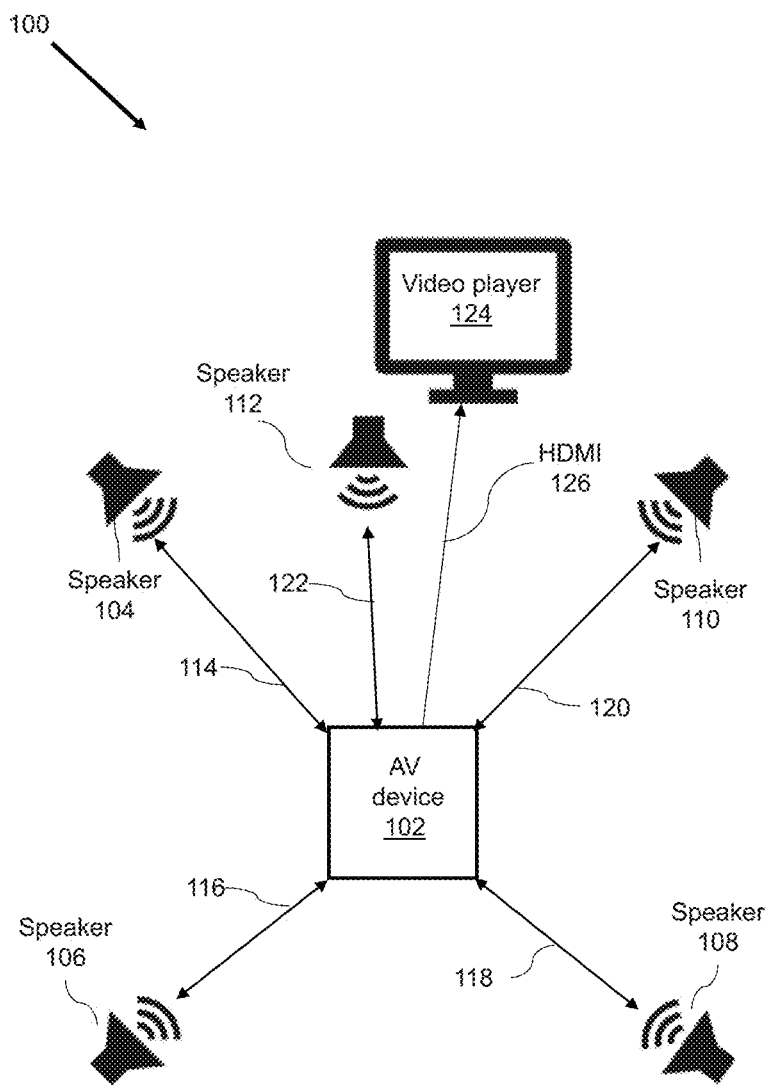
FIG. 1 illustrates a prior-art system of speakers and a video player connected to an AV device.

FIG. 1 illustrates prior-art system 100 of speakers and video player connected to an AV device.

As shown in the figure, system 100 includes an AV device 102, speakers 104-112, and a video player 124. Speaker 104 is connected to AV device 102 by connection 114; speaker 106 is connected to AV device 102 by connection 116; speaker 108 is connected to AV device 102 by connection 118; speaker 110 is connected to AV device 102 by connection 120; and speaker 112 is connected to AV device 102 by connection 122. Video player 124 is connected to AV device 102 by HDMI cable 126.

AV device 102 may be any device or system that is operable to output video and multi-channel audio streams. In this non-limiting example, AV device 102 may be a Blu-ray player or a Roku streaming player.

Video player 124 is any device or system that renders video images from an input video signal. In this non-limiting example, video player 124 may be a flat-screen television or a virtual reality headset.

Speakers 104-112 may be any devices or systems that are fed electrical or data signals and output audible signals. In this non-limiting example, speakers 104-112 may be passive (non-amplified), active (amplified), or may be components of a headphone.

In one embodiment, connections 114-122 are simple wires that carry electrical signals. Wires often require careful placement to be inconspicuous and out of the way. In another embodiment, one or more of connections 114-122 are proprietary wireless signals. These proprietary wireless signals offer more flexibility for placing speakers 104-112 but can restrict the selection of speakers 104-112 to the same brand or product line.

The increasing availability of Wi-Fi networks and Wi-Fi enabled speakers leads to the potential of using Wi-Fi for connections 114-122. However, Wi-Fi presents several challenges, as will be discussed in greater detail with reference to FIG. 2.

Figure 2:
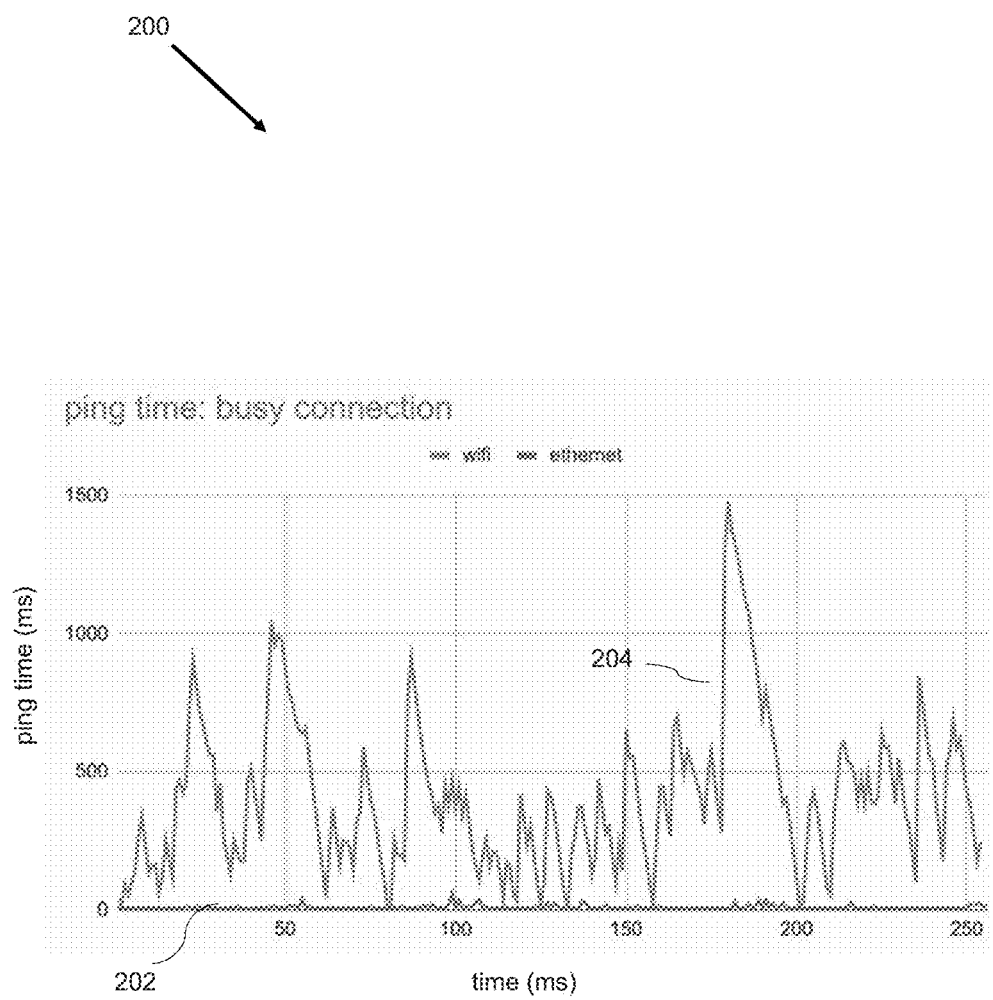
FIG. 2 illustrates typical Wi-Fi channel delays.

FIG. 2 illustrates typical Wi-Fi channel delays.

As shown in FIG. 2, graph 200 compares channel delays of an Ethernet (wired) connection versus a Wi-Fi (wireless) connection. Plot 202 illustrates measured network ping times for a busy Ethernet channel, while plot 204 illustrates measured network ping times for a busy Wi-Fi channel. Network ping time is a common network diagnostic tool and measures round-trip travel times of packets sent from a source network device to a destination network device and back to the source. Graph 200 shows that Wi-Fi channel delays are typically much longer and of greater variation than Ethernet channel delays.

Referring to FIG. 1, using Wi-Fi in connections 114-122 may cause audio being played on speakers 104-112 to be out-of-sync with video being rendered on video player 124. Moreover, audio on each of speakers 104-112 may be out-of-sync with each other due to the stochastic nature of channel delays on connections 114-122.

What is needed is a system and method of synchronizing video presentation with multi-channel audio streams communicated on wireless channels.

A system and method in accordance with the present disclosure enables synchronization of video presentation with multi-channel audio streams communicated on wireless channels.

In accordance with the present disclosure, an AV device is used with a video player, one or more speakers, and encoded AV data. The encoded AV data includes multiplexed encoded video data and encoded audio data. The AV device is connected to the speakers via wireless channels. The AV device is able to determine channel delays associated with each wireless channel; synchronize program clocks of the video player and speakers; determine and modify buffer levels of each speaker; demultiplex the encoded AV data to obtain encoded video data and encoded audio data; and provide prefetched portions of encoded audio data based on buffer levels.

An example system and method of synchronizing video presentation with multi-channel audio streams communicated on wireless channels in accordance with aspects of the present disclosure will now be described in greater detail with reference to FIGS. 3-8D.

Figure 3:
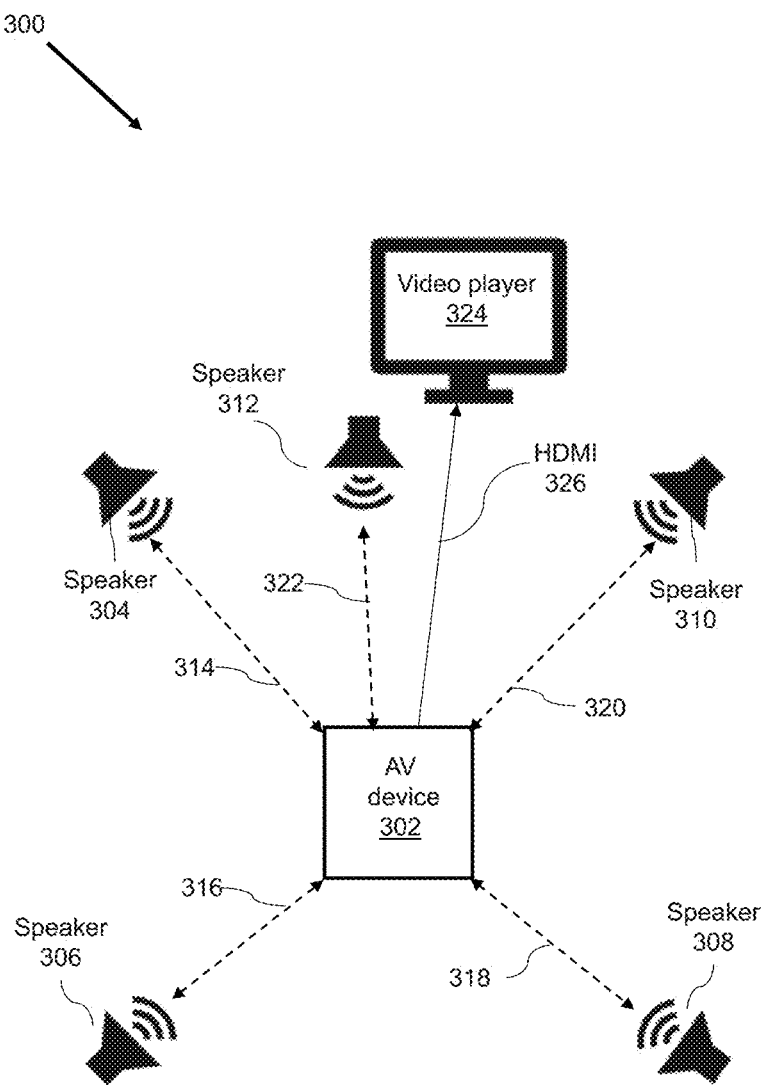
FIG. 3 illustrates a system of speakers and a video player connected to an AV device, in accordance with aspects of the present disclosure.

FIG. 3 illustrates system 300 of speakers and a video player connected to an AV device, in accordance with aspects of the present disclosure.

As shown in the figure, system 300 includes an AV device 302, speakers 304-312, and a video player 324. Speaker 304 is arranged to communicate to AV device 302 by wireless channel 314; speaker 306 is arranged to communicate to AV device 302 by wireless channel 316; speaker 308 is arranged to communicate to AV device 302 by wireless channel 318; speaker 310 is arranged to communicate to AV device 302 by wireless channel 320; and speaker 312 is arranged to communicate to AV device 302 by wireless channel 322. Video player 324 is arranged to communicate to AV device 302 by HDMI cable 326.

AV device 302 may be any device or system that is operable to output video and multi-channel audio streams. Speakers 304-312 are any devices or systems that output audible signals from encoded audio streams. Video player 324 is any device or system that renders video images from an input video signal.

Wireless channels 314-322 are any devices or systems that can wireless communicate encoded audio data between AV device 302 and speakers 304-312. In this non-limiting embodiment, wireless channels 314-322 are Wi-Fi channels. The term "Wi-Fi" as used herein may be considered to refer to any of Wi-Fi 4, 5, 6, 6E, or any variation thereof.

In operation, AV device 302 plays content such as a movie, which is typically streamed to or stored in AV device 302 in a compressed and encoded AV data format. AV device 302 decodes the video portion of the encoded AV data and transmits unencoded video data to video player 324 on HDMI cable 326. AV device 302 transmits encoded audio data to speakers 304-312 on wireless channels 314-322, respectively. Speakers 304-312 decompress the encoded audio data and play the audio channel, e.g., front-center or rear-left, that is appropriate for each speaker.

Audio being played by each of speaker 304-312 must be synchronized with the presentation of video on video player 324. Moreover, when content is paused, skipped, rewound, or fast-forwarded, audio and video streams must be stopped and started at the same timestamps in order to maintain synchronization.

In operation, AV device 302 sets and synchronizes program clocks of video player 324 and speakers 304-312. AV device 302 determines channel delays for each of wireless channels 314-322. AV device 302 sets buffer levels at each of speakers 304-312 that are appropriate for channel delays of wireless channels 314-322. AV device 302 transmits prefetched portions of the encoded audio stream to speakers 304-312. AV device 302 monitors channel delays on wireless channels 314-322 and adjusts buffer levels of speakers 304-312 when necessary.

FIG. 3 illustrates system 300 of AV device 302 connected with video player 324 and speakers 304-312. A method for synchronizing video presentation with multi-channel audio presentation will now be discussed with reference to FIG. 4.

Figure 4:
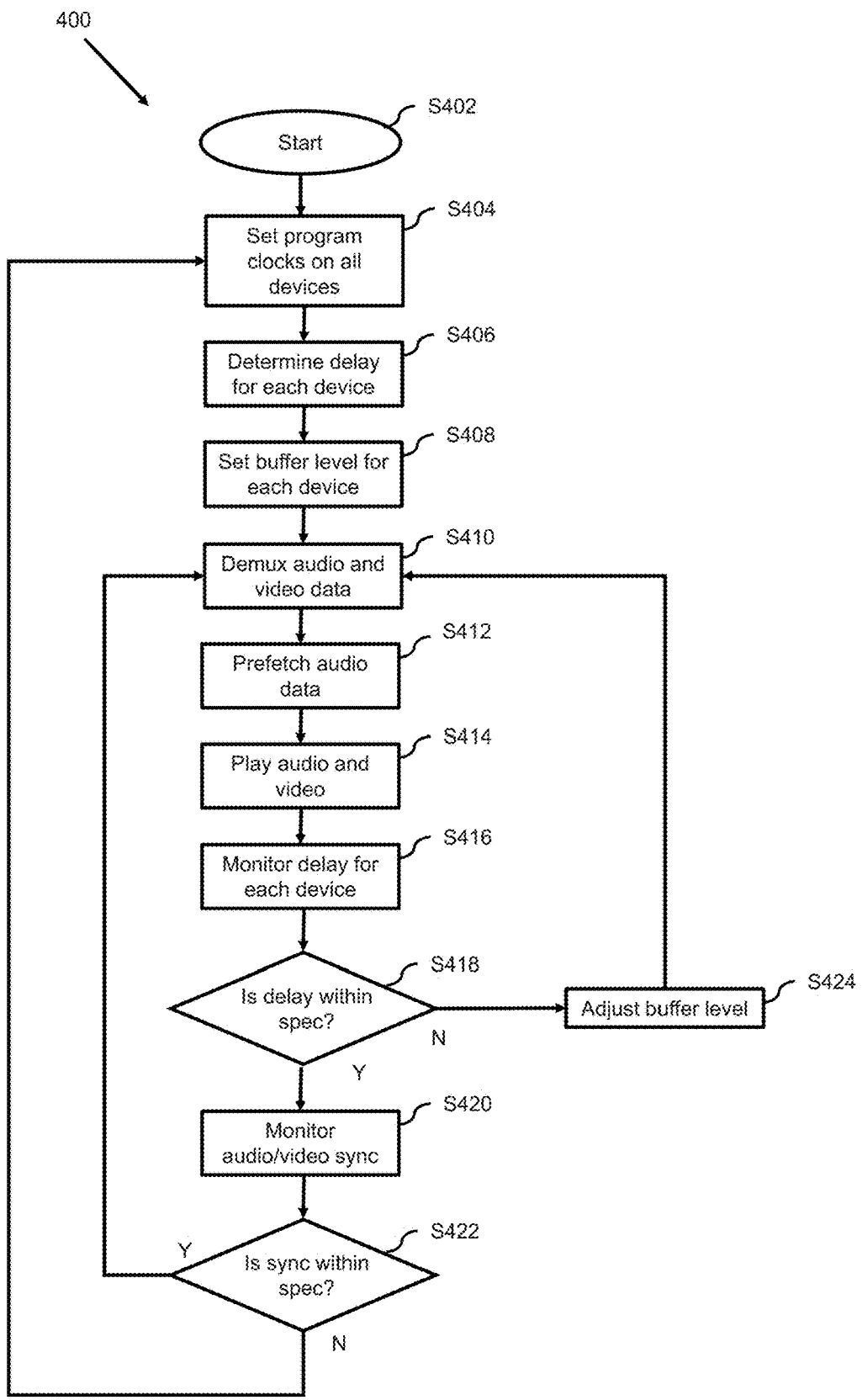
FIG. 4 illustrates a method of synchronizing presentation of video and multi-channel audio, in accordance with aspects of the present disclosure.

FIG. 4 illustrates method 400 of synchronizing presentation of video with multi-channel audio, in accordance with aspects of the present disclosure.

As shown in the figure, method 400 starts (S402) and program clocks are set on all devices (S404). This will now be discussed in greater detail with reference to FIG. 5.

Figure 5:
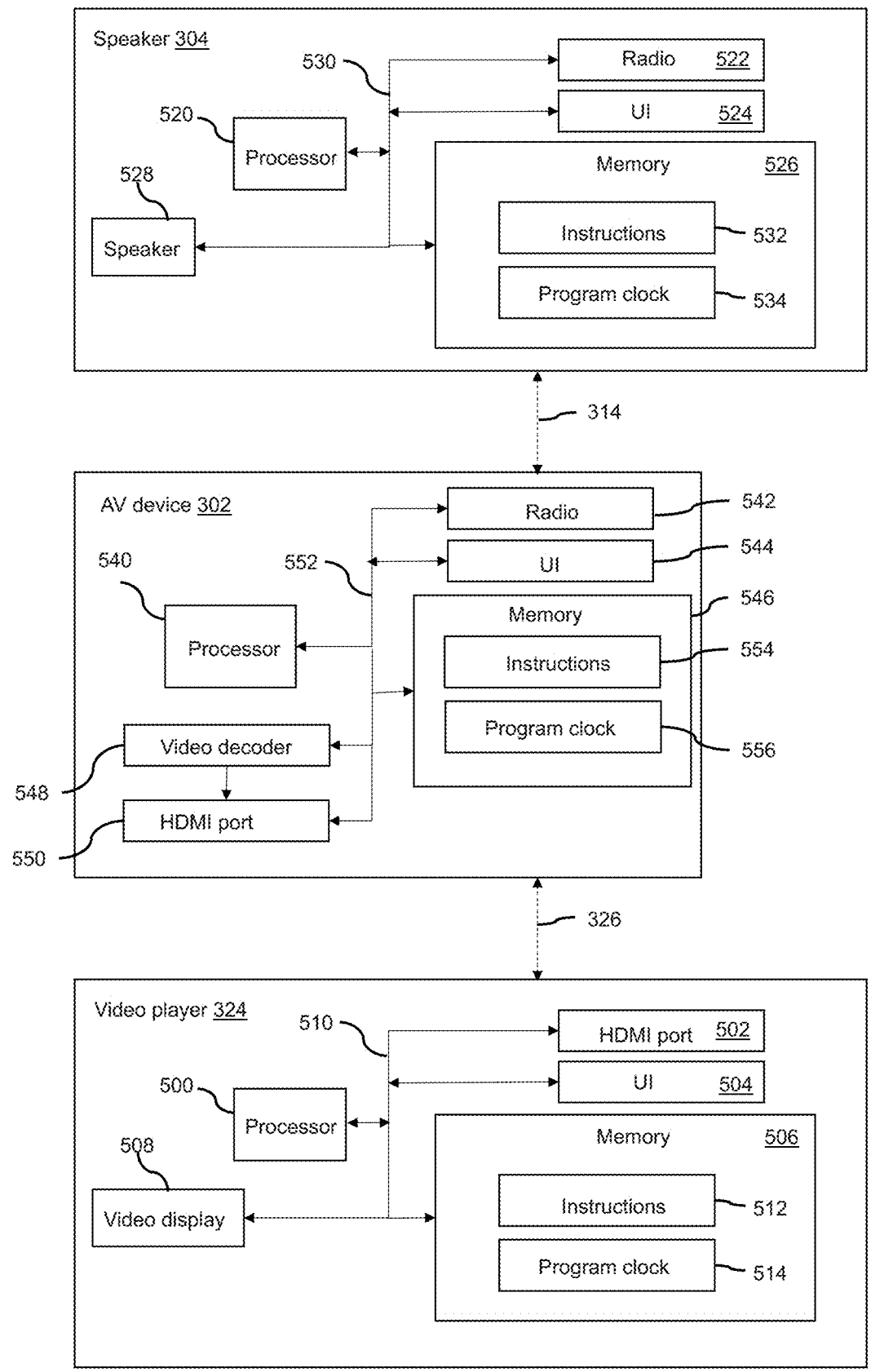
FIG. 5 illustrates aspects of the speaker, the AV device, and the video player, in accordance with aspects of the present disclosure.

FIG. 5 illustrates aspects of speaker 304, AV device 302, and video player 324, in accordance with aspects of the present disclosure.

As shown in the figure, speaker 304 contains a processor 520, a radio 522, a user interface (UI) 524, a memory 526, a and speaker 528. Processor 520, radio 522, UI 524, memory 526, and speaker 528 are connected by bus 530. Processor 520 is configured to execute instructions 532 stored in memory 526. Program clock 534 is stored in memory 526.

Video player 324 contains a processor 500, an HDMI port 502, a UI 504, a memory 506, and a video display 508. Processor 500, HDMI port 502, UI 504, memory 506, and video display 508 are connected by bus 510. Processor 500 is configured to execute instructions 512 stored in memory 506. Program clock 514 is stored in memory 506.

AV device 302 contains a processor 540, a radio 542, a UI 544, a memory 546, a video decoder 548, and HDMI port 550. Processor 540, radio 542, UI 544, memory 546, video decoder 548, and HDMI port 550 are connected by bus 552. Processor 540 is configured to execute instructions 554 stored in memory 546. Program clock 556 is stored in memory 546.

Processors 520, 540, and 500 may be any devices or systems capable of controlling general operations of speaker 304, AV device 302, and video player 324, respectively, and include, but are not limited to, central processing units (CPUs), hardware microprocessors, single-core processors, multi-core processors, field-programmable gate arrays (FPGAs), microcontrollers, application-specific integrated circuits (ASICs), digital signal processors (DSPs), or other similar processing devices capable of executing any type of instructions, algorithms, or software for controlling the operations and functions of speaker 304, AV device 302, and video player 324.

Memories 526, 546, and 506 may be any devices or systems capable of storing data and instructions used by speaker 304, AV device 302, and video player 324, respectively, and include, but are not limited to, random-access memories (RAM), dynamic random-access memories (DRAM), hard drives, solid-state drives, read-only memories (ROM), erasable programmable read-only memories (EPROM), electrically erasable programmable read-only memories (EEPROM), flash memories, embedded memories blocks in FPGAs, or any other various layers of memory hierarchy.

Instructions 532, 554, and 512 operate the functions of speaker 304, AV device 302, and video player 324, respectively. Instructions 532, 554, and 512, having a set (at least one) of program modules, may be stored in memories 526, 546, and 506 by way of example, and not limitation, as well as an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the application as described herein.

As will be described in greater detail below, instructions 554 include instructions, that when executed by processor 540, cause AV device 302 to determine a buffer level of speaker 304, demultiplex the encoded AV signal to obtain the encoded video data and the encoded audio data, determine a channel delay associated with wireless channel 314, modify the buffer level of speaker 304 based on the channel delay, set program clocks of video player 324 and speaker 304 to the same speed, and provide to speaker 304 a prefetched portion of the encoded audio data based on the modified buffer level.

As will be described in greater detail below, in some embodiments, instructions 554 may additionally include instructions, that when executed by processor 540, cause AV device 302 to determine buffer level of speaker 310; determine a channel delay associated with wireless channel 320; set program clock of video player 324, program clock of speaker 304 and the program clock of speaker 310 to the same speed; modify the buffer level of speaker 310 based on the channel delay associated with wireless channel 320; and provide, to speaker 310, a second prefetched portion of the encoded audio data based on the modified buffer level of speaker 310. As will be described in greater detail below, in some of these embodiments, instructions 554 may additionally include instructions, that when executed by processor 540, cause AV device 302 to generate an audio streaming session based on the encoded audio data; replicate the audio streaming session for each of speaker 304 and speaker 310; and enable a trick play to be simultaneously performed by speaker 304, speaker 310 and video player 324.

HDMI ports 550 and 502 may be any devices or systems that can be configured to transmit or receive multimedia data over HDMI cable 326.

UIs 524, 544, and 504 may be any devices or systems capable of presenting information and accepting user inputs on speaker 304, AV device 302, and video player 324, respectively, and include, but are not limited to, liquid crystal displays (LCDs), thin film transistor (TFT) displays, light-emitting diodes (LEDs), touch screens, buttons, microphones, and speakers.

In this example, processor 540, radio 542, UI 544, memory 546, video decoder 548, and HDMI port 550 are illustrated as individual devices of AV device 302. However, in some embodiments, at least two of processor 540, radio 542, UI 544, memory 546, video decoder 548, and HDMI port 550 may be combined as a unitary device. Further, in some embodiments, at least one of processor 540, radio 542, UI 544, memory 546, video decoder 548, and HDMI port 550 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to processor 540 such that processor 540 may read information from, and write information to, the tangible computer-readable media. In the alternative, the tangible computer-readable media may be integral to processor 540. Processor 540 and the tangible computer-readable media may reside in an integrated circuit (IC), an ASIC, or large scale integrated circuit (LSI), system LSI, super LSI, or ultra LSI components that perform a part or all of the functions described herein. In the alternative, processor 540 and the tangible computer-readable media may reside as discrete components.

Example tangible computer-readable media may be also coupled to systems, non-limiting examples of which include a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Bus 552 may be any device or system that provides data communications between processor 540, radio 542, UI 544, memory 546, video decoder 548, and HDMI port 550. Bus 552 can be one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program clocks 534, 556, and 514 are clocks or counters that are used as references in the process of decoding and presenting AV data. Aspects of program clocks 534, 556, and 514 will now be discussed in greater detail with reference to FIG. 6.

Figure 6:
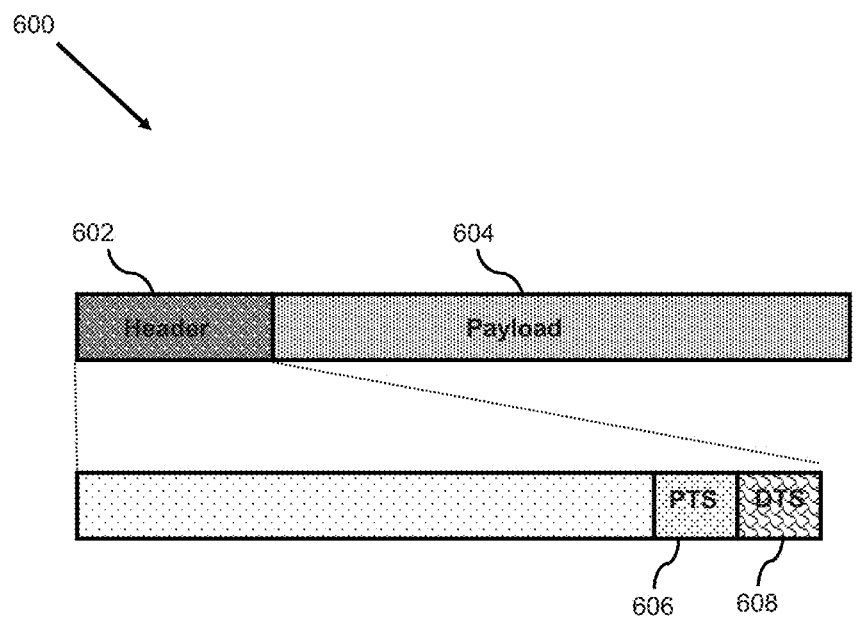
FIG. 6 illustrates encoded AV data, in accordance with aspects of the present disclosure.

FIG. 6 illustrates encoded AV data 600, in accordance with aspects of the present disclosure.

As shown in the figure, encoded AV data 600 contains header 602 and payload 604. In this non-limiting example, encoded AV data 600 utilizes the MPEG format. MPEG defines several types of timestamps, including decoding timestamps (DTS 608) and presentation timestamps (PTS 606). DTS 608 determines the order in which MPEG data frames are decoded. PTS 606 determines the instant that audio or video information is presented. Program clocks 514 and 534 use PTS 606 to ensure that video and audio are presented, or rendered, with correct synchronization.

Returning to FIG. 4, program clocks are set on all devices (S404). Referring to FIG. 5, processor 540 on AV device 302 running instructions 554 to set program clocks 534, 556, and 514 to run at the same speed.

Returning to FIG. 4, delays for each device are determined (S406). Returning to FIGS. 3 and 5, processor 540 on AV device 302 running instructions 554 determines delays for speakers 304-312 on wireless channels 314-322. Delays may be determined using any number of known methods such as measuring network ping time on each of wireless channels 314-322.

Returning to FIG. 4, buffer levels for each device are set (S408). For example, referring to FIGS. 3 and 5, processor 540 on AV device 302 running instructions 554 sets buffer levels for speakers 304-312. Aspects of setting buffer levels will now be discussed in greater detail with reference to FIG. 7.

Figure 7:
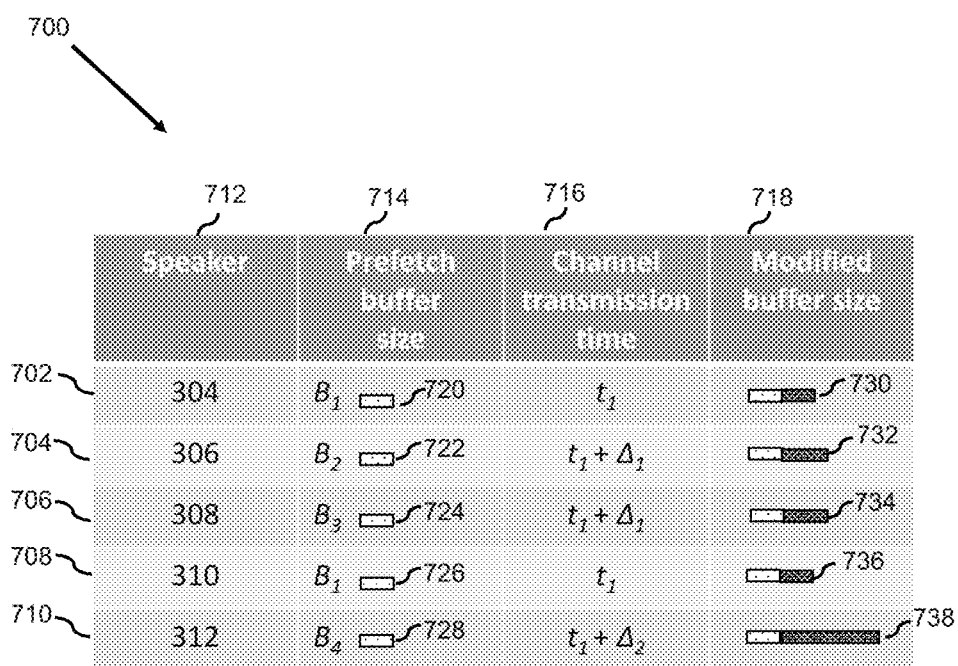
FIG. 7 illustrates channel delays and speaker buffer sizes, in accordance with aspects of the present disclosure.

FIG. 7 illustrates table 700 of channel delays and speaker buffer sizes, in accordance with aspects of the present disclosure.

As shown in the figure, table 700 includes a prefetch buffer size column 714, a channel transmission time column 716, a modified buffer size column 718, and a speaker column 712. As shown on rows 702, 704, 706, 708 and 710, speaker 304 is initially configured with prefetch buffer size 720, speaker 306 is initially configured with prefetch buffer size 722, and so on through speaker 312.

For purposes of discussion and referring to FIG. 4, suppose that it is determined that channel transmission time 716 for speakers 304 and 310 is $t_1$, channel transmission time 716 for speakers 306 and 308 is $t_1+\Delta_1$, and channel transmission time 716 for speaker 312 is $t_1+\Delta_2$. Referring to FIG. 5, processor 540 on AV device 302 running instructions 554 to set the buffer level of speaker 304 to modified buffer size 730, buffer level of speaker 306 to modified buffer size 732, buffer level of speaker 308 to modified buffer size 734, buffer level of speaker 310 to modified buffer size 736, and buffer level of speaker 312 to modified buffer size 738.

Returning to FIG. 4, encoded AV data is demultiplexed (S410). Aspects of demultiplexing and decoding AV data will now be discussed in greater detail with reference to FIGS. 8A-D.

FIGS. 8A-D illustrate AV data being demultiplexed and decoded by AV device 302 and speaker 304, in accordance with aspects of the present disclosure.

Figure 8A:
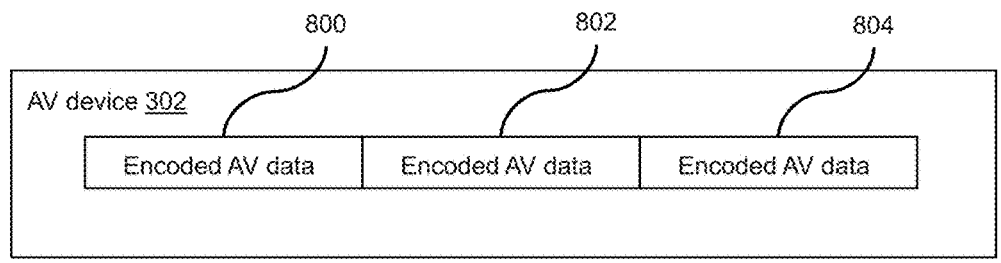
FIGS. 8A-D illustrate AV data being demultiplexed and decoded by the AV device and speakers at times $T_0$, $T_1$, $T_2$, and $T_3$, respectively, in accordance with aspects of the present disclosure.

As shown in FIG. 8A, encoded AV data 800-804 are streamed or stored on AV device 302 at time $T_0$. Encoded AV data 800-804 comprise data packets containing both compressed audio and compressed video data. For purposes of discussion, suppose that PTS=1 for encoded AV data 800, PTS=2 for encoded AV data 802, and PTS=3 for encoded AV data 804.

Figure 8B:
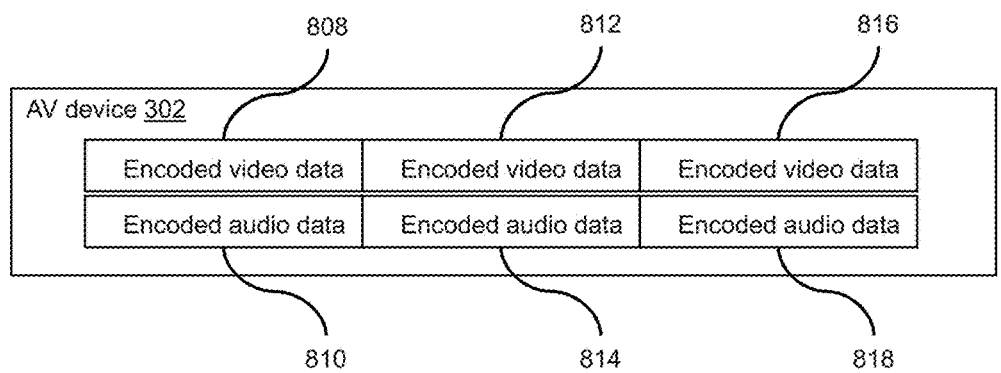
Figure 8C:
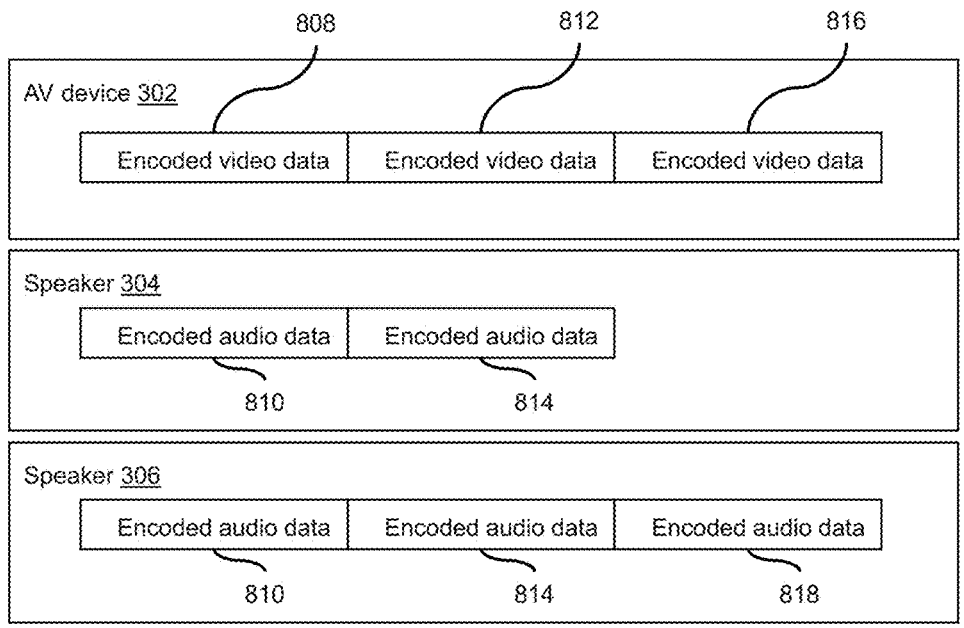

As shown in FIG. 8B, at time $T_1$ encoded AV data 800-804 are demultiplexed by processor 540 in AV device 302, with reference to FIG. 5, into data streams comprising encoded video data 808, 812, and 816 and encoded audio data 810, 814, and 818. In this example, PTS=1 for encoded video data 808 and encoded audio data 810, PTS=2 for encoded video data 812 and encoded audio data 814, and PTS=3 for encoded video data 816 and encoded audio data 818.

Returning to FIG. 4, audio data is prefetched (S412). For example, referring to FIG. 8C, at time $T_2$, speaker 304 prefetches encoded audio data 810 and 814. Referring to FIG. 7, since modified buffer size 732 of speaker 306 is larger than modified buffer size 730 of speaker 304, speaker 306 prefetches encoded audio data 810, 814, and 818.

Figure 8D:
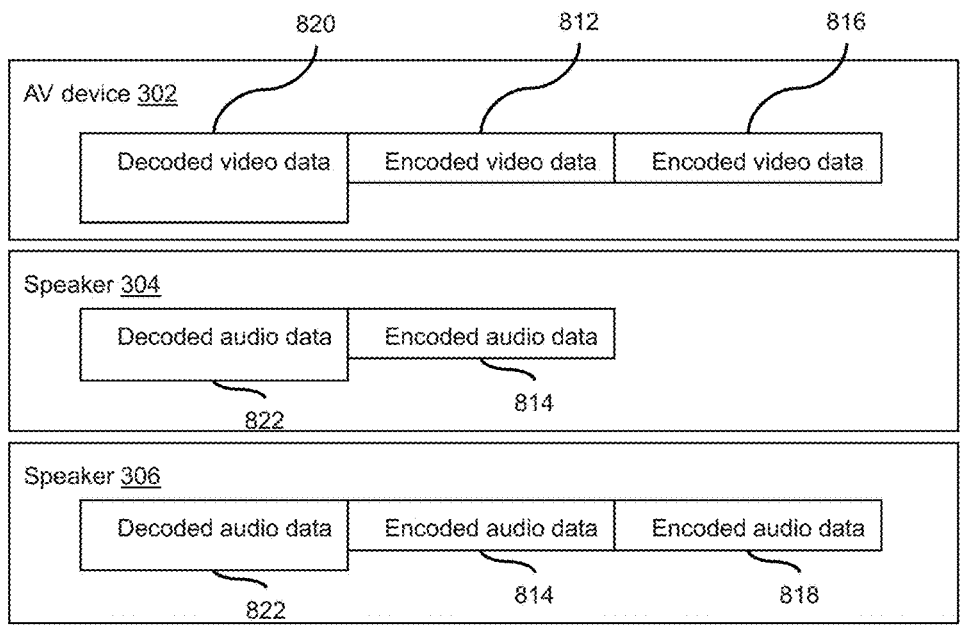

Returning to FIG. 4, audio and video are played (S414). Referring to FIG. 8D, at time $T_3$ encoded video data 808 are decompressed into decoded video data 820 and encoded audio data 810 are decompressed into decoded audio data 822. AV device 302 sends decoded video data 820 to video player 324 to be rendered; speaker 304 plays its designated channel of decoded audio data 822; and speaker 306 plays its designated channel of decoded audio data 822. Because modified buffer size 732 is larger than modified buffer size 730, as shown in FIG. 7, speaker 306 prefetches more audio data than speaker 304 to account for its higher channel delay.

Returning to FIG. 4, delays are monitored for each device (S416). Referring to FIGS. 5 and 7, processor 540 on AV device 302 running instructions 554 monitors channel transmission times 716 for speakers 304-312.

Returning to FIG. 4, delays are compared to a predetermined threshold (S418). Referring to FIGS. 5 and 7, if channel transmission times 716 deviate too much from specifications (N on S418), then processor 540 on AV device 302 running instructions 554 adjusts buffer sizes of speakers 304-412 to appropriate levels (S424). Processor 540 then continues to demultiplex audio and video data (S410).

Returning to FIG. 4, if delays are within specifications (Y on S418), then audio/video synchronization is monitored (S420). Audio/video synchronization may be monitored by any number of known methods, including transmitting out-of-band synchronization signals, or may be interrupted by manual user intervention.

Returning to FIG. 4, audio/video sync is compared to a pre-determined threshold (S422). If audio/video synchronization is within specification (Y on S422), then method 400 continues to demultiplex audio and video data (S410). If audio/video synchronization is out of specification or is interrupted (N on S422), then audio and video streaming sessions are terminated and restarted by setting program clocks (S404).

In operation, deviations in audio/video synchronization may be caused by several issues including clock drift, channel interference, channel loss, or power interruption. Audio/video synchronization may also be interrupted by a user choosing to perform a trick play with the content, which includes pausing, fast-forwarding, rewinding, or skipping to another location. In these scenarios, processor 540 on AV device 302 running instructions 554 to reestablish audio and video sessions by reinitializing program clocks, determining channel delays and buffer levels, and prefetching audio data. Audio and video synchronization is then reestablished on video player 324 and speakers 304-312.

Today's AV systems often employ multi-channel audio to recreate spatial environments. It is desirable to take advantage of the ubiquity of Wi-Fi networks to transmit audio data over Wi-Fi to be received by wireless speakers, which can be more flexibly placed in a home or office space. However, Wi-Fi channel delays may cause problems with synchronizing audio channels with each other and with video playback.

In accordance with the present disclosure, an AV device is used with a video player, one or more speakers, and encoded AV data. The encoded AV data includes multiplexed encoded video data and encoded audio data. The AV device is connected to the speakers via wireless channels. The AV device is able to determine channel delays associated with each wireless channel; synchronize program clocks of the video player and speakers; determine and modify buffer levels of each speaker; demultiplex the encoded AV data to obtain encode video data and encoded audio data; and provide prefetched portions of encoded audio data based on buffer levels.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. An audio/video (AV) device for use with a video player, a speaker, and encoded AV data including multiplexed encoded video data and encoded audio data, said AV device comprising:
a memory having instructions stored therein; and
a processor configured to execute the instructions stored on said memory to cause said AV device to:
determine a buffer level of the speaker based on a prefetch buffer size of the speaker, wherein the speaker is wirelessly connected to the AV device over a wireless channel that has a media parameter;
demultiplex the encoded AV data to obtain the encoded video data and the encoded audio data;
determine a channel delay associated with the wireless channel;
modify the buffer level of the speaker based on the channel delay;
set the buffer level of the speaker to the modified buffer level;
set a video player program clock of the video player and a speaker program clock of the speaker to the same speed;
provide, to the speaker, a prefetched portion of the encoded audio data based on the modified buffer level, wherein the speaker is configured to play sound based on the speaker program clock;
send, to the video player, decoded video data based on decompressing the encoded video data, wherein the video player is configured to play video data based on the video player program clock;
monitor the channel delay;
determine a deviation from a specification based on the monitoring the channel delay;
terminate providing to the speaker the prefetched portion based on the deviation; and
reestablish one or more audio and video sessions.

2. The AV device of claim 1,
wherein the wireless channel comprises a Wi-Fi channel, and
wherein the encoded AV data comprises MPEG data.

3. The AV device of claim 2, for further use with a high-definition multimedia interface (HDMI) cable connecting the video player with said AV device,
wherein the encoded video data comprises MPEG video data, and
wherein said processor is further configured to execute the instructions stored on said memory to additionally cause said AV device to:
decompress the MPEG video data; and
transmit the decompressed MPEG video data to the video player via the HDMI cable.

4. The AV device of claim 1, for further use with a second speaker being wirelessly connected to said AV device over a second wireless channel, having a second speaker program clock, and being configured to play sound based on the encoded audio data, the second wireless channel having a second media parameter,
wherein said processor is further configured to execute the instructions stored on said memory to additionally cause said AV device to:
determine a second buffer level of the second speaker;
determine a second channel delay associated with the second wireless channel;
set the video player program clock, the speaker program clock and the second speaker program clock to the same speed;

modify the second buffer level of the second speaker based on the second channel delay; and provide, to the second speaker, a second prefetched portion of the encoded audio data based on the modified second buffer level.

5. The AV device of claim 4, wherein said processor is further configured to execute the instructions stored on said memory to additionally cause said AV device to:

generate an audio streaming session based on the encoded audio data;

replicate the audio streaming session for each of the speaker and the second speaker; and enable a trick play to be simultaneously performed by the speaker, the second speaker and the video player.

6. A method of using an audio/video (AV) device with a video player, a speaker, and encoded AV data including multiplexed encoded video data and encoded audio data, said method comprising:

determining, via a processor configured to execute instructions stored on a memory of the AV device, a buffer level of the speaker based on a prefetch buffer size of the speaker, wherein the speaker is wirelessly connected to the AV device over a wireless channel that has a media parameter;

demultiplexing, via the processor, the encoded AV data to obtain the encoded video data and the encoded audio data;

determining, via the processor, a channel delay associated with the wireless channel;

modifying, via the processor, the buffer level of the speaker based on the channel delay;

setting the buffer level of the speaker to the modified buffer level;

setting, via the processor, a video player program clock of the video player and a speaker program clock of a speaker to the same speed;

providing, via the processor and to the speaker, a prefetched portion of the encoded audio data based on the modified buffer level-, wherein the speaker is configured to play sound based on the speaker program clock;

sending, to the video player, decoded video data based on decompressing the encoded video data, wherein the video player is configured to play video data based on the video player program clock;

monitoring the channel delay;

determining a deviation from a specification based on the monitoring the channel delay;

terminating providing to the speaker the prefetched portion based on the deviation; and reestablishing one or more audio and video sessions.

7. The method of claim 6, wherein the wireless channel comprises a Wi-Fi channel, and wherein the encoded AV data comprises MPEG data.

8. The method of claim 7, wherein the AV device is for further use with a high-definition multimedia interface (HDMI) cable connecting the video player with the AV device, and wherein the encoded video data comprises MPEG video data, said method further comprising:

decompressing, via the processor, the MPEG video data; and transmitting, via the processor, the decompressed MPEG video data to the video player via the HDMI cable.

9. The method of claim 6, wherein the AV device is for further use with a second speaker being wirelessly connected to the AV device over a second wireless channel, having a second speaker program clock, and being configured to play sound based on the encoded audio data, the second wireless channel having a second media parameter, said method further comprising:

determining, via the processor, a second buffer level of the second speaker;

determining, via the processor, a second channel delay associated with the second wireless channel;

setting, via the processor, the video player program clock, the speaker program clock and the second speaker program clock to the same speed;

modifying, via the processor, the second buffer level of the second speaker based on the second channel delay; and providing, via the processor and to the second speaker, a second prefetched portion of the encoded audio data based on the modified second buffer level.

10. The method of claim 9, further comprising:

generating, via the processor, an audio streaming session based on the encoded audio data;

replicating, via the processor, the audio streaming session for each of the speaker and the second speaker; and enabling, via the processor, a trick play to be simultaneously performed by the speaker, the second speaker and the video player.

11. A non-transitory, computer-readable media having computer-readable instructions stored thereon, the computer-readable instructions being capable of being read by an audio/video (AV) device for use with a video player, a speaker, and encoded AV data including multiplexed encoded video data and encoded audio data, wherein the computer-readable instructions are capable of instructing the AV device to perform the method comprising:

determining, via a processor configured to execute instructions stored on a memory, a buffer level of the speaker based on a prefetch buffer size of the speaker, wherein the speaker is wirelessly connected to the AV device over a wireless channel that has a media parameter;

demultiplexing, via the processor, the encoded AV data to obtain the encoded video data and the encoded audio data;

determining, via the processor, a channel delay associated with the wireless channel;

modifying, via the processor, the buffer level of the speaker based on the channel delay;

setting the buffer level of the speaker to the modified buffer level;

setting, via the processor, a video player program clock of the video player and a speaker program clock of the speaker to the same speed;

providing, via the processor and to the speaker, a prefetched portion of the encoded audio data based on the modified buffer level-, wherein the speaker is configured to play sound based on the speaker program clock;

sending, to the video player, decoded video data based on decompressing the encoded video data, wherein the video player is configured to play video data based on the video player program clock;

monitoring the channel delay;

determining a deviation from a specification based on the monitoring the channel delay;

terminating providing to the speaker the prefetched portion based on the deviation; and reestablishing one or more audio and video sessions.

12. The non-transitory, computer-readable media of claim 11, wherein the computer-readable instructions are capable of instructing the AV device to perform the method
wherein the wireless channel comprises a Wi-Fi channel, and
wherein the encoded AV data comprises MPEG data.

13. The non-transitory, computer-readable media of claim 12, wherein the AV device is for further use with a high-definition multimedia interface (HDMI) cable connecting the video player with the AV device, wherein the encoded video data comprises MPEG video data, and wherein the computer-readable instructions are capable of instructing the AV device to perform the method further comprising:
decompressing, via the processor, the MPEG video data; and
transmitting, via the processor, the decompressed MPEG video data to the video player via the HDMI cable.

14. The non-transitory, computer-readable media of claim 11, wherein the AV device is for further use with a second speaker being wirelessly connected to the AV device over a second wireless channel, having a second speaker program clock, and being configured to play sound based on the encoded audio data, the second wireless channel having a second media parameter, and wherein the computer-readable instructions are capable of instructing the AV device to perform the method further comprising:
determining, via the processor, a second buffer level of the second speaker;
determining, via the processor, a second channel delay associated with the second wireless channel;
setting, via the processor, the video player program clock, the speaker program clock and the second speaker program clock to the same speed;
modifying, via the processor, the second buffer level of the second speaker based on the second channel delay; and
providing, via the processor and to the second speaker, a second prefetched portion of the encoded audio data based on the modified second buffer level.

15. The non-transitory, computer-readable media of claim 14, wherein the computer-readable instructions are capable of instructing the AV device to perform the method further comprising:
generating, via the processor, an audio streaming session based on the encoded audio data;
replicating, via the processor, the audio streaming session for each of the speaker and the second speaker; and
enabling, via the processor, a trick play to be simultaneously performed by the speaker, the second speaker and the video player.

* * * * *